United States Patent
Avital

(10) Patent No.: US 10,468,894 B2
(45) Date of Patent: Nov. 5, 2019

(54) CHARGER FOR A MOBILE DEVICE AND MAGNETIC STICKER USABLE THEREWITH

(71) Applicants: Solomon Avital, Berlin (DE); Yaniv Hamama, Ramat-Gan (IL)

(72) Inventor: Solomon Avital, Berlin (DE)

(73) Assignee: SoloQi Corp., Aventura, FL (US)

( * ) Notice: Subject to any disclaimer, the term of this patent is extended or adjusted under 35 U.S.C. 154(b) by 33 days.

(21) Appl. No.: 15/038,149

(22) PCT Filed: Nov. 24, 2014

(86) PCT No.: PCT/IL2014/051018
§ 371 (c)(1),
(2) Date: May 20, 2016

(87) PCT Pub. No.: WO2015/075724
PCT Pub. Date: May 28, 2015

(65) Prior Publication Data
US 2016/0294201 A1    Oct. 6, 2016

Related U.S. Application Data

(60) Provisional application No. 61/908,125, filed on Nov. 24, 2013.

(51) Int. Cl.
*H02J 7/00*        (2006.01)
*H04M 1/04*        (2006.01)
(Continued)

(52) U.S. Cl.
CPC .......... *H02J 7/0044* (2013.01); *H01R 31/065* (2013.01); *H01R 35/04* (2013.01); *H04B 1/3883* (2013.01); *H04M 1/04* (2013.01)

(58) Field of Classification Search
CPC .... H02J 7/0044; H02J 7/0054; H01R 31/065; H01R 35/04; G06F 1/1632
(Continued)

(56) References Cited

U.S. PATENT DOCUMENTS 3,750,078 A    7/1973 Bruder
3,885,483 A    5/1975 Ikeya et al.
(Continued)

FOREIGN PATENT DOCUMENTS

| FR | 2 135 264 A1 | 12/1972 |
| KR | 101204510 B1 | 11/2012 |
| WO | 2015075724 A1 | 5/2015 |

OTHER PUBLICATIONS

International Search Report and Written Opinion from International Application No. PCT/IL2014/051018 dated Apr. 2, 2015.

*Primary Examiner* — Zixuan Zhou
(74) *Attorney, Agent, or Firm* — Greenberg Traurig, LLP

(57) ABSTRACT

A device for charging a mobile phone, comprising: a body having a length dimension, a width dimension and a thickness dimension, with the thickness dimension being substantially smaller than the length dimension and the width dimension; a power plug integrated in the body; and a charging and mounting support integrated on a front surface of the body, detachably and mechanically mounting and electronically connecting a back interface integrated on a back surface of a mobile phone; wherein in order to charge the mobile phone, a power connector of the charging and mounting support is connected mechanically and electronically to a power connector of the back interface; and wherein the back interface is rotationally movable and rotationally locking when mounted on the charging and mounting support.

11 Claims, 14 Drawing Sheets

(51) Int. Cl.
*H01R 31/06* (2006.01)
*H01R 35/04* (2006.01)
*H04B 1/3883* (2015.01)

(58) Field of Classification Search
USPC .............. 320/112–115; 361/679.41; 455/559
See application file for complete search history.

(56) References Cited

U.S. PATENT DOCUMENTS

| | | |
|---|---|---|
| 3,940,107 A | 2/1976 | Allenbaugh, Jr. |
| 5,684,280 A | 11/1997 | Franz et al. |
| 7,114,197 B2 | 10/2006 | Garneau et al. |
| 7,168,969 B1 | 1/2007 | Wang |
| 7,619,388 B1 * | 11/2009 | Nana .................. H01M 2/1066 320/114 |
| 7,726,994 B1 | 6/2010 | Willey |
| 2006/0103493 A1 | 5/2006 | Kley et al. |
| 2008/0278899 A1 * | 11/2008 | Hotelling .............. G06F 1/1632 361/679.41 |
| 2012/0071008 A1 | 3/2012 | Sessford |
| 2012/0164849 A1 * | 6/2012 | Lee .................... H01R 13/6205 439/39 |
| 2012/0175932 A1 | 7/2012 | Moriyama et al. |
| 2013/0058023 A1 * | 3/2013 | Supran .................. G06F 1/1632 361/679.01 |
| 2013/0150134 A1 | 6/2013 | Pliner et al. |
| 2013/0303000 A1 | 11/2013 | Witter et al. |
| 2014/0355200 A1 | 12/2014 | Thiers |
| 2015/0171649 A1 | 6/2015 | Kim et al. |

* cited by examiner

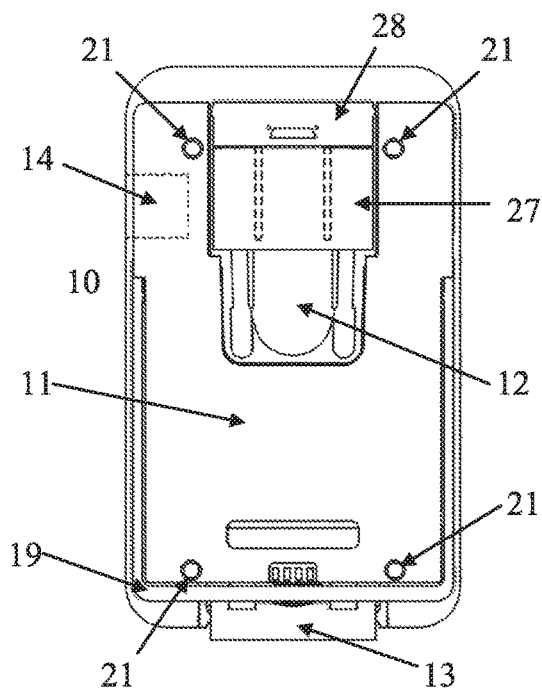
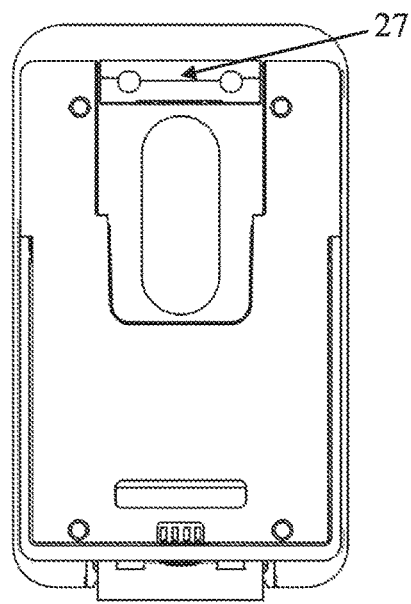
FIG. 5A
FIG. 5B
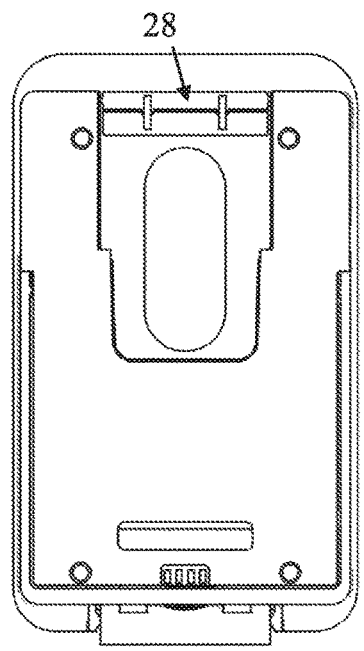
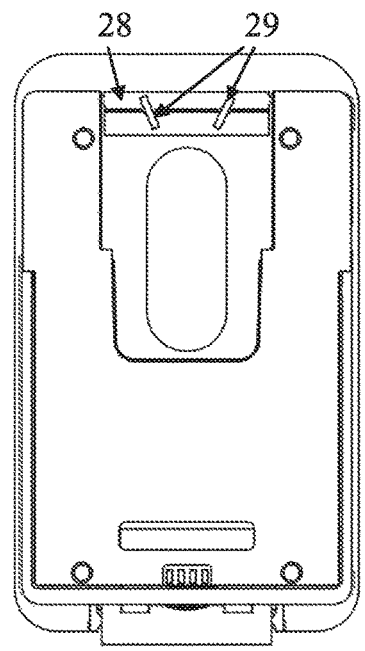
FIG. 5C
FIG. 5D

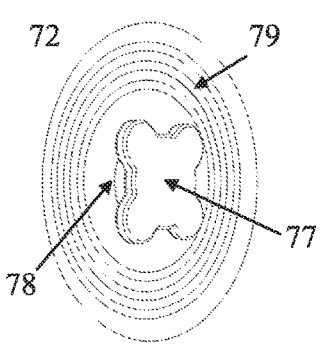
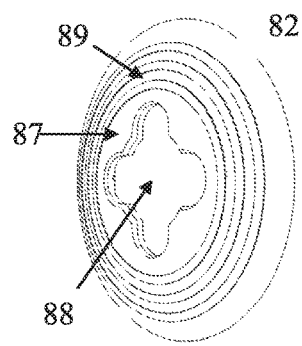
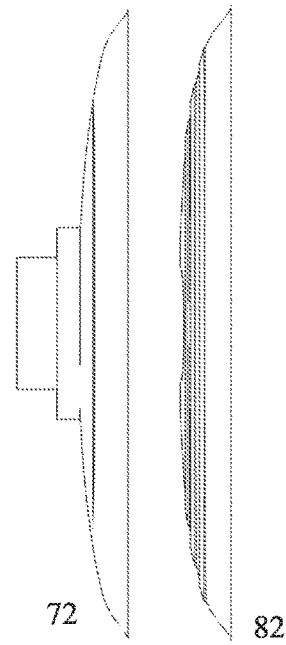
FIG. 13A    FIG. 13B
FIG. 14
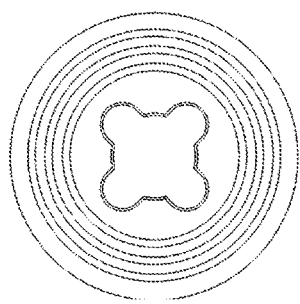
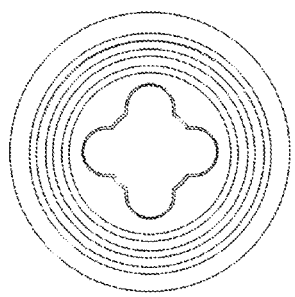
FIG. 15A    FIG. 15C
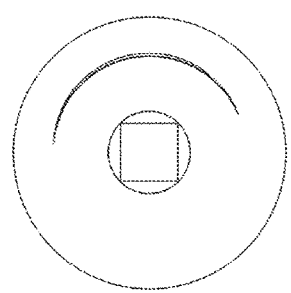
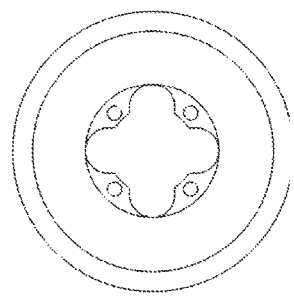
FIG. 15B    FIG. 15D

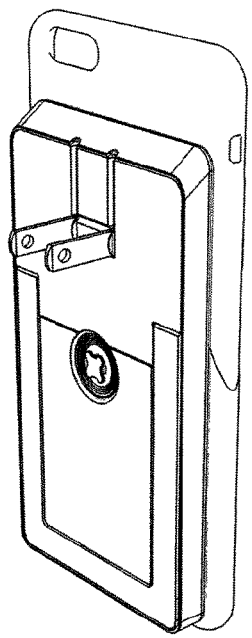 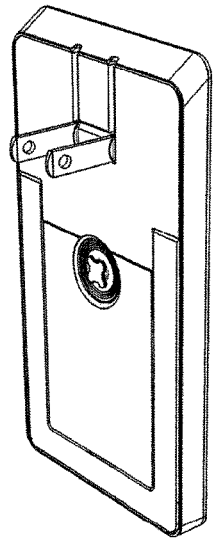 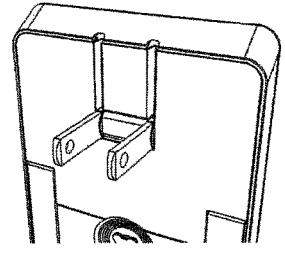 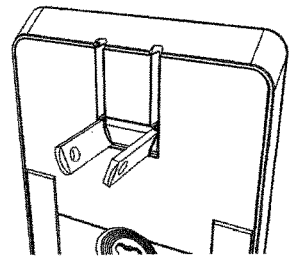
FIG. 20A  FIG. 20B  FIG. 20C
FIG. 20D
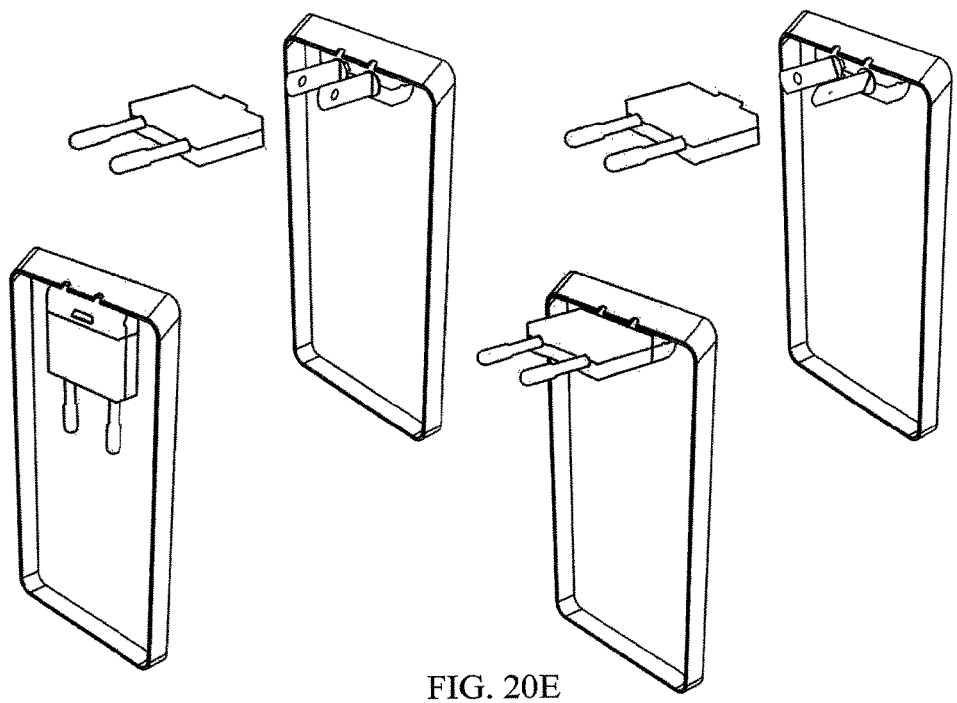
FIG. 20E

CHARGER FOR A MOBILE DEVICE AND MAGNETIC STICKER USABLE THEREWITH

RELATED APPLICATIONS

This application is a national phase filing under 35 USC 371 of International Application No. PCT/IL2014/051018, filed on Nov. 24, 2014, which claims the benefit of U.S. Patent Application No. 61/908,125, filed on Nov. 24, 2013, the entirety of these applications are hereby incorporated herein by reference in their entirety for all purposes.

FIELD AND BACKGROUND OF THE INVENTION

The present invention, in some embodiments thereof, relates to a charger for a mobile phone and, more particularly, but not exclusively, to a slim-form charger for a mobile phone.

Mobile phones require frequent charging of their battery. This results in many users of mobile phones who are carrying a charger with them.

Most existing chargers for mobile phones contain a wire connecting a power plug to the mobile phone. Some existing chargers contain multiple plugs for different types of mobile phone.

Some existing chargers for mobile phones contain a battery for charging the mobile phone when a power outlet is unavailable.

SUMMARY OF THE INVENTION

According to an aspect of some embodiments of the present invention there is provided a device for charging a mobile phone, comprising: a body having a length dimension, a width dimension and a thickness dimension, with the thickness dimension being substantially smaller than the length dimension and the width dimension; a power plug integrated in the body; and a charging and mounting support integrated on a front surface of the body, detachably and mechanically mounting and electronically connecting a back interface integrated on a back surface of a mobile phone; wherein in order to charge the mobile phone, a power connector of the charging and mounting support is connected mechanically and electronically to a power connector of the back interface; and wherein the back interface is rotationally movable and rotationally locking when mounted on the charging and mounting support.

Optionally, the charging and mounting support comprises a recess that is mechanically coupled with a protrusion of the back interface.

Optionally, the charging and mounting support comprises a locking plate connected to the front surface of the body by a centric rod.

More optionally, the locking plate is perpendicular to a longitudinal axis of the centric rod on its distal end.

More optionally, the back interface comprises a plate having an aperture sized and shaped for receiving the locking plate, so the locking plate may be inserted into the aperture to mechanically couple the charging and mounting support with the back interface.

More optionally, the locking plate and the aperture are plus shaped.

Optionally, the back interface has an open position at a diagonal orientation relative to the device and locked positions at a landscape orientation and a portrait orientation.

Optionally, the power connector of the charging and mounting support comprises a set of concentric coil rings.

More optionally, the power connector of the back interface comprises a set of concentric coil rings, mechanically and electronically connected to the power connector of the charging and mounting support when the back interface is mounted on the charging and mounting support.

Optionally, the back interface is integrated on a back surface of a mobile phone case encasing the mobile phone.

More optionally, the back interface is electronically connected to a phone plug integrated on a bottom of the mobile phone case for connecting to a power jack located at the bottom face of the mobile phone.

More optionally, the back interface is electronically connected to the phone plug via a thin flex printed circuit board (PCB).

Optionally, the device further comprises an attachment unit integrated on a back surface of the body for attaching an external element.

More optionally, the attachment unit comprises a set of concentric coil rings.

Optionally, the device further comprises a battery.

More optionally, the battery is integrated in the body.

More optionally, the battery is charged through the power plug.

More optionally, the mobile phone is charged from the battery.

More optionally, the battery provides power for electronic elements of the device.

More optionally, the battery provides power for an external element connected to the device.

More optionally, the battery is charged through an external element connected to the device.

More optionally, the battery is detachable from the device.

According to an aspect of some embodiments of the present invention there is provided a kit for charging a mobile phone, comprising: a charging device, comprising: a body having a length dimension, a width dimension and a thickness dimension, with the thickness dimension being substantially smaller than the length dimension and the width dimension; a power plug integrated in the body; and a charging and mounting support integrated on a front surface of the body; and a mobile phone case comprising a back interface integrated on a back surface of the mobile phone case, detachably and mechanically mounted, and electronically connected to the charging and mounting support; wherein in order to charge a mobile phone encased in the mobile phone case, a power connector of the charging and mounting support is connected physically and electronically to a power connector of the back interface; and wherein the back interface is rotationally movable and rotationally locking when mounted on the charging and mounting support.

According to an aspect of some embodiments of the present invention there is provided a method for manufacturing a device for charging a mobile phone, comprising: providing a body having a length dimension, a width dimension and a thickness dimension, with the thickness dimension being substantially smaller than the length dimension and the width dimension, a power plug and a charging and mounting support; integrating the power plug in the body; and integrating the charging and mounting support on a front surface of the body, so the charging and mounting support is detachably and mechanically mounting, and electronically connecting a back interface integrated on a back surface of a mobile phone; wherein in order to charge the mobile phone, a power connector of the charging and mounting support is connected mechanically and electronically to a power connector of the back interface; and wherein the back interface is rotationally movable and rotationally locking when mounted on the charging and mounting support.

According to some embodiments of the present invention there is provided a device for charging a mobile phone, comprising: a body having a length dimension, a width dimension and a thickness dimension, with the thickness dimension being substantially smaller than the length dimension and the width dimension; a power plug integrated in the body; and a bottom charging and mounting support integrated in the body, detachably and mechanically mounting and electronically connecting a replaceable charging adapter selected from a plurality of replaceable charging adapters; wherein in order to charge a mobile phone, a power jack located at the bottom face of the mobile phone is connected mechanically and electronically to the mounted replaceable charging adapter and the mobile phone is mechanically supported by the bottom charging and mounting support and by the body.

Optionally, the bottom charging and mounting support comprises a frame surrounding the mounted replaceable charging adapter.

Optionally, each one of the plurality of replaceable charging adapters comprises a surface element, a phone plug substantially perpendicular to the surface element for connecting a mobile phone and a charger plug substantially perpendicular to the surface element for mounting the adapter on the bottom charging and mounting support.

Optionally, the power plug is foldable, having an operable position and a stowed position.

Optionally, the bottom charging and mounting support is foldable, having an operable position and a stowed position.

Optionally, when the power plug and the bottom charging and mounting support are in stowed positions, the power plug and the bottom charging and mounting support are incorporated within the dimensions of the body.

Optionally, prongs of the power plug are substantially perpendicular to a plane defined by the length dimension and the width dimension of the body when the power plug is in operable position.

Optionally, the power plug is mounting a power adapter compatible with a different power outlet type.

Optionally, at least one of the plurality of charging plugs is substantially parallel to a plane defined by the length dimension and the width dimension of the body when mounted on the bottom charging and mounting support and the bottom charging and mounting support is in operable position.

Optionally, the device further comprises a slot for a memory card electronically connected to the mobile phone through the bottom charging and mounting support.

More optionally, data from the mobile phone is copied to the memory card for backup.

Optionally, the device further comprises an integrated memory unit in the body.

More optionally, data from the mobile phone is copied to the integrated memory unit for backup.

Optionally, the device further comprises a folding arm for standing the device in a slanted position.

Optionally, the device further comprises an attachment unit for attaching an external element.

More optionally, the attachment unit is a metallic unit and the external element is attached using at least one magnet integrated in the external element.

According to some embodiments of the present invention there is provided a device for charging a mobile phone, comprising: a body having a length dimension, a width dimension and a thickness dimension, with the thickness dimension being substantially smaller than the length dimension and the width dimension; a power plug integrated in the body; a bottom charging and mounting support integrated in the body; and a binding recess formed in the body along the length dimension for confining a lateral movement of a binding unit attached to a back of a mobile phone along the width dimension.

Optionally, the binding recess is a metal plate and the binding unit is a magnetic unit.

According to some embodiments of the present invention there is provided a device for charging a mobile phone, comprising: a body having a length dimension, a width dimension and a thickness dimension, with the thickness dimension being substantially smaller than the length dimension and the width dimension; a power plug integrated in the body; a bottom charging and mounting support integrated in the body, detachably and mechanically mounting and electronically connecting a replaceable charging adapter selected from a plurality of replaceable charging adapters; and a binding recess formed in the body along the length dimension for confining a lateral movement of a binding unit attached to a back of a mobile phone along the width dimension; wherein in order to charge a mobile phone, a power jack located at the bottom face of the mobile phone is connected mechanically and electronically to the mounted replaceable charging adapter and the mobile phone is mechanically supported by the bottom charging and mounting support and by the binding unit.

According to some embodiments of the present invention there is provided a method for manufacturing a device for charging a mobile phone, comprising: providing a body having a length dimension, a width dimension and a thickness dimension, with the thickness dimension being substantially smaller than the length dimension and the width dimension, a power plug and a bottom charging and mounting support; forming a binding recess in the body along the length dimension; integrating the power plug and the bottom charging and mounting support in the body, so when a mobile phone is charged, the mobile phone is mechanically supported by the bottom charging and mounting support and by the body and a lateral movement of a binding unit attached to a back of the mobile phone is confined by the binding recess.

Optionally, the method further comprises providing a plurality of replaceable charging adapters mountable on the bottom charging and mounting support.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 5A is a rear view of the device of FIG. 2A with stowed exemplary American power plug with an exemplary European power adapter, according to some embodiments of the present invention;

FIG. 5B is a rear view of the device of FIG. 2A with power plug in operable position and with an power adapter, according to some embodiments of the present invention;

FIG. 5C is a rear view of the device of FIG. 2A with power plug in operable position and without an power adapter, according to some embodiments of the present invention;

FIG. 5D is a rear view of the device of FIG. 2A with rotating prongs of the power plug, according to some embodiments of the present invention.

FIG. 13A and FIG. 13B are illustrations of a charging and mounting support and back interface, according to some embodiments of the present invention;

FIG. 14 is an illustration of a side view of a charging and mounting support and a back interface, according to some embodiments of the present invention;

FIG. 15A, FIG. 15B, FIG. 15C and FIG. 15D are illustrations of different views of a charging and mounting support and a back interface, according to some embodiments of the present invention;

Figures 7, 8:
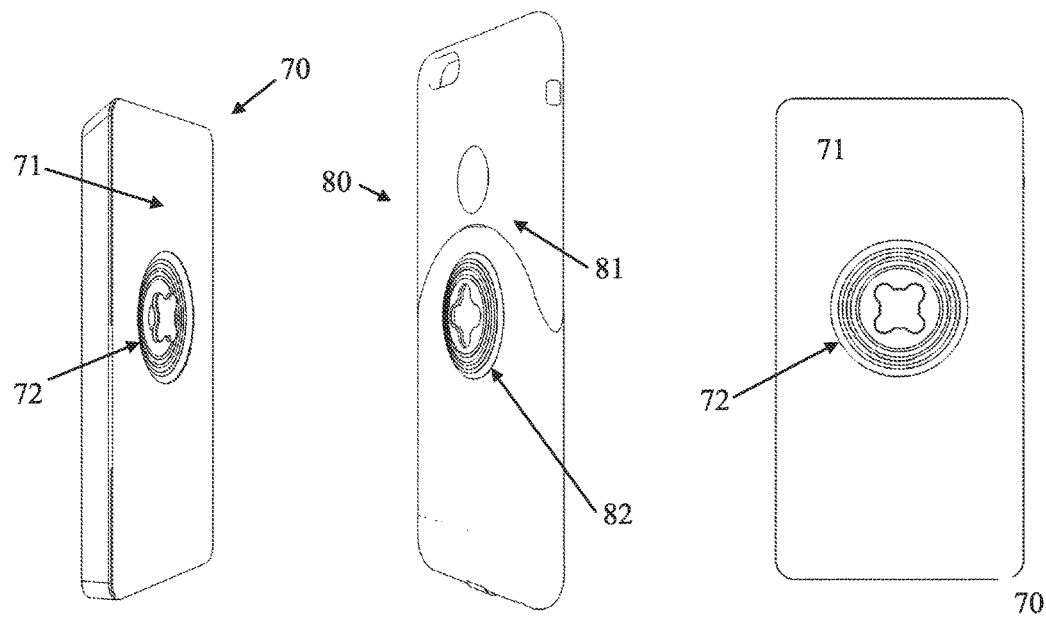
FIG. 7 is an illustration of a device 70 for charging a mobile phone and a compatible mobile phone case 80, according to some embodiments of the present invention.
FIG. 8 is an illustration of a front view of device of FIG. 7, according to some embodiments of the present invention.
Figure 21:
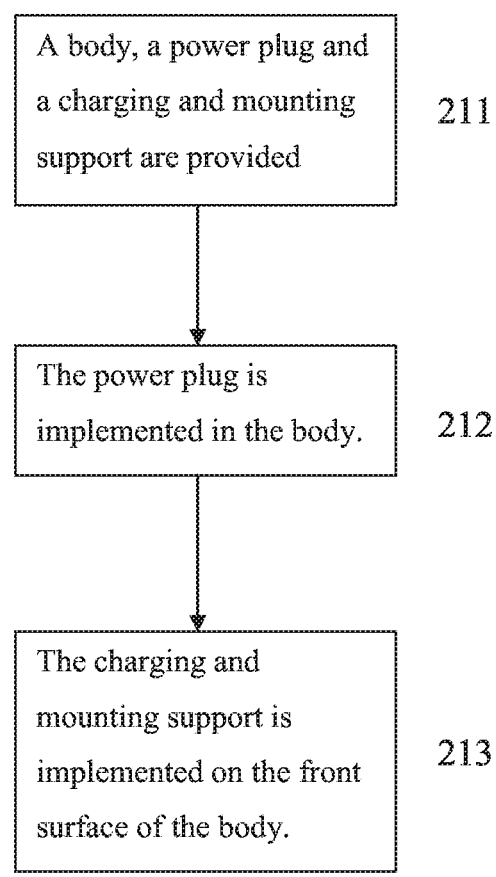

Reference is now made to FIG. 20A, FIG. 20B, FIG. 20C, FIG. 20D and FIG. 20E are illustrations of the device of FIG. 7 with different positions of the power plug, according to some embodiments of the present invention;

FIG. 21 is a flowchart schematically representing a method for manufacturing the device of FIG. 7, according to some embodiments of the present invention.

DESCRIPTION OF EMBODIMENTS OF THE INVENTION

The present invention, in some embodiments thereof, relates to a charger for a mobile phone and, more particularly, but not exclusively, to a slim-form charger for a mobile phone.

According to some embodiments of the present invention, there is provided a device for charging a mobile phone, containing a slim-form body, a power plug and a bottom charging and mounting support. The bottom charging and mounting support supports the mounting of a replaceable charging adapter selected from a series of replaceable charging adapters. In order to charge a mobile phone using the device, a power jack located at the bottom face of the mobile phone is connected, mechanically and electronically, to the replaceable charging adapter and is mechanically supported by the bottom support and by the slim-form body. Optionally, each replaceable charging adapter contains a surface element, a phone plug for connecting a mobile phone and a charger plug for mounting the replaceable charging adapter on the bottom charging and mounting support, so the plugs are perpendicular to the surface element. The power plug and the bottom charging and mounting support may be foldable. Also, the device may contain other optional elements, such as a battery, a memory card slot and/or a folding arm.

According to some embodiments of the present invention, there is provided a device for charging a mobile phone, containing a slim-form body, a power plug, a bottom charging and mounting support and a binding recess for holding a mobile phone, when a binding unit, such as a sticker, is attached to the mobile phone. This binding recess allows the mobile phone to be held in a comfortable position, for example, for viewing and/or typing, and in different orientations.

According to some embodiments of the present invention, there is provided a device for charging a mobile phone, containing a slim-form body, a power plug and a charging and mounting support on a front surface of the body. The charging and mounting support supports the mounting of a compatible back interface of a mobile phone. In order to charge the mobile phone, a power connector of the charging and mounting support is connected, mechanically and electronically, to a power connector of the back interface. When the back interface is mounted on the charging and mounting support, the mobile phone may move and lock rotationally so the mobile phone is positioned at different orientations.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Referring now to the drawings, FIG. 1A, FIG. 1B, FIG. 1C and FIG. 1D are illustrations of a device 10 for charging a mobile phone, according to some embodiments of the present invention. Device 10 contains a body 11 which has slim-form, so the thickness of body 11 is significantly smaller the length or width of body 11. For example, the thickness of body 11 may be 8, 10, 12 millimeters and/or any other size, the width of body 11 may be 4, 6, 8 centimeters and/or any other size and the length of body 11 may be 8, 10, 12 centimeters and/or any other size.

Figure 1A:
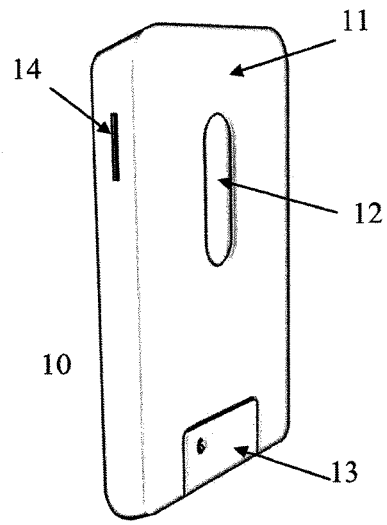
FIG. 1A is an illustration of a device for charging a mobile phone in a compact position, according to some embodiments of the present invention.

FIG. 1A is an illustration of device 10 in a compact position. The slim-form of body 11 allows device 10 to be carried conveniently by a user, for example, inside a pocket or a small purse. Optionally, body 11 is made of plastic, however other materials are possible, for example metal, rubber, ceramic materials and/or carbon fibers.

Device 10 also contains a bottom charging and mounting support 13, integrated in body 11. Optionally, bottom charging and mounting support 13 is integrated at one edge of the length dimension of body 11. Optionally, bottom charging and mounting support 13 is foldable, having an operable position and a stowed position. When device 10 is in compact position, bottom charging and mounting support 13 is in stowed position, as shown in FIG. 1A.

Figure 1B:
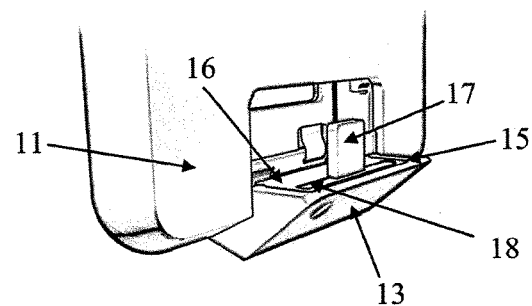
FIG. 1B is an illustration of a bottom charging and mounting support of the device of FIG. 1A in an operable position, according to some embodiments of the present invention.

FIG. 1B is an illustration of bottom charging and mounting support 13 of device 10 in an operable position, according to some embodiments of the present invention. Bottom charging and mounting support 13 mounts a replaceable charging adapter 15 of a set of replaceable charging adapters. Bottom charging and mounting support 13 is connected to replaceable charging adapter 15 mechanically and electronically. Each one of replaceable charging adapters 15 is compatible for a different type of mobile phone. Replacing replaceable charging adapters 15 allows users to charge phones of different types with the same charger.

When a mobile phone is charged using device 10, the mobile phone is connected mechanically and electronically to replaceable charging adapter 15 and is mechanically supported by bottom charging and mounting support 13 and by said body 11. Bottom charging and mounting support 13 is therefore suitable for multiple types of mobile phones, having replaceable charging adapters, while still rigidly supporting any mobile phone when charging.

Replaceable charging adapter 15 contains a surface element 16, a phone plug 17 for connecting a power jack of a mobile phone, and a charger plug 18 for mounting replaceable charging adapter 15 on bottom charging and mounting support 13. Phone plug 17 and charger plug 18 are substantially perpendicular to surface element 16. Charger plug 18 fits directly into bottom charging and mounting support 13, so that surface element 16 is merged into the surface of bottom charging and mounting support 13. Optionally, bottom charging and mounting support 13 contains a frame surrounding mounted replaceable charging adapter 15. A mobile phone may then be connected to phone plug 17 for charging. Phone plug 17 is different for each replaceable charging adapter 15 from the replaceable charging adapters, and is compatible with power jacks of different mobile phones. For example, one phone plug may be compatible with an iPhone-4 power jack, an iPhone-5 power jack, or a MicroUSB power jack.

Device 10 also contains a binding recess 12 formed in body 11 along the length dimension, for confining a lateral movement of a binding unit attached to the back of a mobile phone, along said width dimension. Binding recess 12 may be constructed to use any type of detachable binding, for example, magnetic binding, hook-and-loop fasteners, mechanic binding or any other binding. Optionally, binding recess 12 is a metal plate. The metal plate may be made from any magnetic metal, such as steel, iron, nickel and/or cobalt. The binding unit may then be a magnetic unit, for example, a magnetic sticker attached to the mobile phone and/or a magnet integrated on a case of the mobile phone. Optionally, binding recess 12 is a magnetic plate and the binding unit is a metal plate attached to the mobile phone.

When a mobile phone is charged using device 10, the mobile phone is mechanically supported by bottom charging and mounting support 13 and by body 11 using binding recess 12. The replaceable charging adapters allow bottom charging and mounting support 13 to support multiple types of mobile phones. Binding recess 12 may hold multiple types of mobile phones by attaching the binding unit in different positions on binding recess 12, for example in different positions along the longitudinal axis crossing binding recess 12 from bottom to top. The combination of these elements allows a user to easily use device 10 for different mobile phones.

Optionally, binding recess 12 has larger attachment surface than the binding unit, so that mobile phones of different sizes, having a binding unit at different positions, may be held by binding recess 12 so the binding unit may be located at different parts of binding recess 12, when charging or when not charging. Also, when positioning a mobile phone at different orientations or heights on device 10, the binding unit may be located at different parts of binding recess 12.

Optionally, when device 10 is connected to a power outlet and the mobile phone is in vertical position the mobile phone is mechanically supported by bottom charging and mounting support 13 and held by the binding unit to binding recess 12 thus supported by body 11.

Figure 1C:
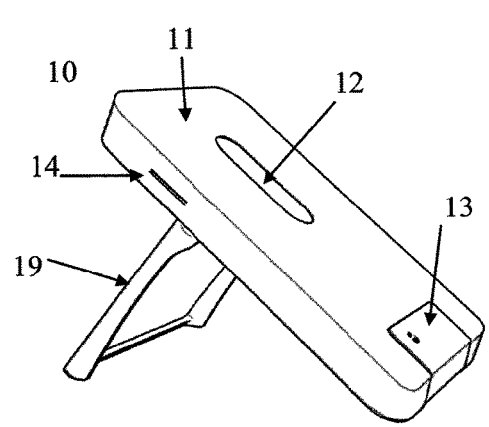
FIG. 1C is an illustration of the device of FIG. 1A in a slanted position, according to some embodiments of the present invention.

FIG. 1C is an illustration of device 10 in a slanted position, according to some embodiments of the present invention. Optionally, body 11 also includes a folding arm 19 for standing device 10 in a slanted position. Folding arm 19 may be in a stowed position inside body 11 or may be opened to be used as a stand. Optionally, the degree by which device 10 is slanted may be adjusted by folding arm 19. Optionally, folding arm 19 is made of plastic, however, other materials are possible such as metal.

When the mobile phone is held by the magnetic unit to metal plate 12, the position of the mobile phone allows the user, for example, to view a video, read a document or type a message. Also, the mobile phone may be turned in any orientation of the 360 degrees, for example, to a portrait orientation or landscape orientation.

Figure 1D:
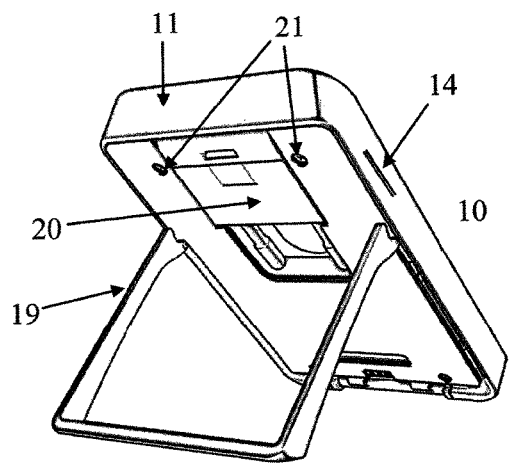
FIG. 1D is an illustration of the device of FIG. 1A in a slanted position viewed from the back, according to some embodiments of the present invention.

FIG. 1D is an illustration of device 10 in a slanted position viewed from the back, according to some embodiments of the present invention. Device 10 also contains a power plug 20 integrated in body 11. Optionally, power plug 20 is foldable, having an operable position and a stowed position. When device 10 is in compact position, power plug 20 is in stowed position, as shown in FIG. 1A. Optionally, power plug 20 is electronically connected to bottom charging and mounting support 13 to allow direct charging of the mobile phone from a power outlet.

Optionally, device contains a battery, for example integrated in body 11. Optionally, the battery is electronically connected to power plug 20 so the battery is charged from a power outlet through power plug 20. Optionally, the battery is electronically connected to bottom charging and mounting support 13 so the mobile phone is charged directly from the battery. This is useful as backup for the mobile phone's battery when there is no access to a power outlet. Optionally, body 11 contains a socket for the battery, and the battery may be inserted or removed from the socket. Optionally, the battery is external to body 11 and connected to body 11, for example, by an adapter or a cord.

Optionally, device 10 contains a slot 14 for a memory card electronically connected to the mobile phone through bottom charging and mounting support 13. Optionally, device 10 contains an integrated memory unit in body 11. The memory unit may be, for example, solid-state memory, magnetic memory and/or optic memory.

Optionally, data from the mobile phone is copied to the integrated memory unit or memory card for backup. The data may include, for example, phone calls logs, messages record, photos, notes and/or applications installed on the mobile phone. Optionally, the transfer of data for backup is performed automatically when the mobile phone is connected to bottom charging and mounting support 13. Optionally, the transfer of data is performed by an electronic circuit included in device 10. Optionally, the transfer of data may be triggered by a button pressed by the user. The button may be located, for example, on body 11. Optionally, the transfer of data is performed by an application installed on the mobile phone. The transfer of data may be triggered, for example, by the attachment of the mobile phone to device 10 identified by the application, and/or by a command made by the user. Optionally, slot 14 is used to transfer data from the memory card to the mobile phone, for example, photos saved on the memory card by another device, such as a digital camera.

Optionally, device 10 contains an attachment unit for attaching an external element. Optionally, the attachment unit is a metallic unit, and the external element is attached using at least one magnet integrated in the external element. Optionally, the attachment unit contains screws 21 that are also used for fastening body 11 and components integrated inside body 11, for example, a printed circuit board. The external element may be, for example, smart electronic wallet, makeup kit with mirror and light-emitting diode (LED) light and/or solar panel and/or any other dedicated accessory.

Figure 2A:
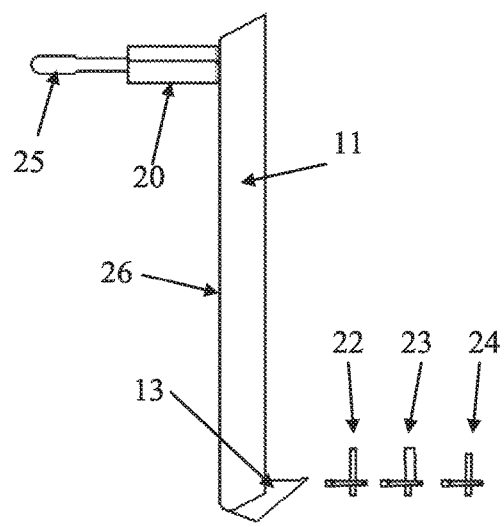
FIG. 2A is a side view of a device for charging a mobile phone, according to some embodiments of the present invention.

Reference is now made to the drawings, FIG. 2A, which is a side view of a device 10 for charging a mobile phone, according to some embodiments of the present invention. Replaceable charging adapters 22, 23 and 24 are a set of replaceable charging adapters, each is compatible for a different type of mobile phone. Optionally, prongs 25 of power plug 20 are substantially perpendicular to a plane 26 defined by the length dimension and the width dimension of body 11 when power plug 20 is in operable position.

Figures 2B, 2C, 2D, 2E:
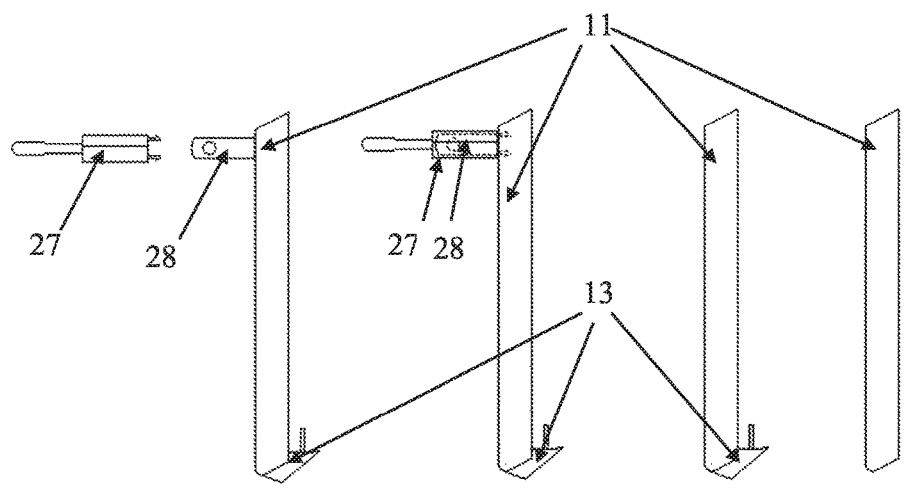
FIG. 2B is a side view of the device of FIG. 2A with separated power adapter, according to some embodiments of the present invention.
FIG. 2C is a side view of the device of FIG. 2A with connected power adapter, according to some embodiments of the present invention.
FIG. 2D is a side view of the device of FIG. 2A with stowed power plug, according to some embodiments of the present invention.
FIG. 2E is a side view of the device of FIG. 2A in compact position, according to some embodiments of the present invention.

Reference is now made to FIG. 2B, which is a side view of device 10 with separated power adapter, according to some embodiments of the present invention. Optionally, power plug 28 is mounting a power adapter 27 compatible with a different power outlet type. For example, power plug 28 is compatible with an American power outlet, and power adapter 27 is compatible with European power outlet.

FIG. 2C is a side view of device 10 with connected power adapter, according to some embodiments of the present invention. Optionally, power plug 28 is completely covered by power adapter 27.

FIG. 2D is a side view of device 10 with stowed power plug, according to some embodiments of the present invention. Optionally, power plug 26 is in stowed position when mounting power adapter 27.

FIG. 2E is a side view of device 10 in compact position, according to some embodiments of the present invention. In this position, both power plug 28 and bottom charging and mounting support 13 are in stowed position. Optionally, in compact position and power plug 28 and bottom charging and mounting support 13 are incorporated within the dimensions of body 11, so device 10 may be carried easily by a user.

Figure 3A:
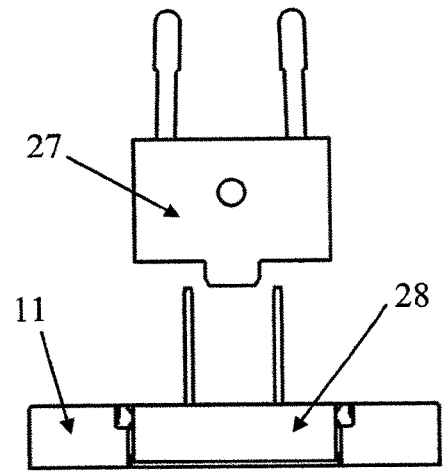
FIG. 3A is a top view of the device of FIG. 2A with separated power adapter and stowed bottom charging and mounting support, according to some embodiments of the present invention.
Figure 3B:
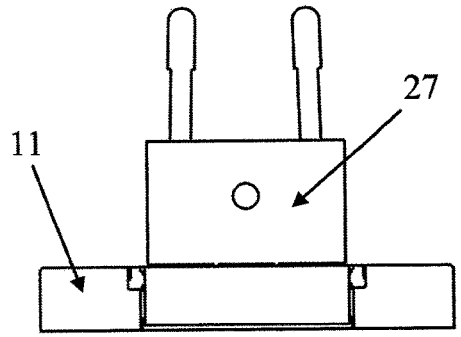
FIG. 3B is a top view of the device of FIG. 2A with connected power adapter and stowed bottom charging and mounting support, according to some embodiments of the present invention.

FIG. 3A is a top view of device 10 with separated power adapter 27 and stowed bottom charging and mounting support, according to some embodiments of the present invention. FIG. 3B, is a top view of device 10 with connected power adapter 27 and stowed bottom charging and mounting support, according to some embodiments of the present invention.

Figure 3C:
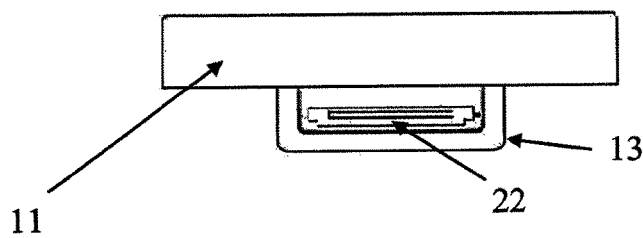
FIG. 3C is a top view of the device of FIG. 2A stowed power plug and with an exemplary replaceable charging adapter for iPhone-4, according to some embodiments of the present invention.
Figure 3D:
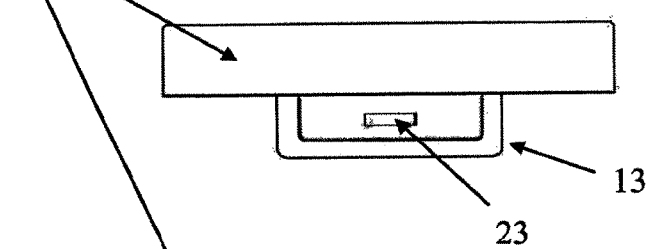
FIG. 3D is a top view of the device of FIG. 2A stowed power plug and with an exemplary replaceable charging adapter for iPhone-5, according to some embodiments of the present invention.
Figure 3E:
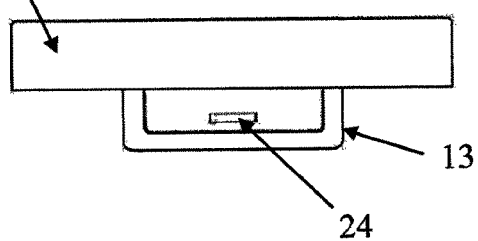
FIG. 3E is a top view of the device of FIG. 2A stowed power plug and with an exemplary replaceable charging adapter for MicroUSB, according to some embodiments of the present invention.

FIG. 3C, FIG. 3D, and FIG. 3E are top views of device 10 with stowed power plug and with exemplary replaceable charging adapters, according to some embodiments of the present invention. In FIG. 3C an exemplary replaceable charging adapter 22 compatible with a power jack of an iPhone-4 is shown. In FIG. 3D an exemplary replaceable charging adapter 23 compatible with a power jack of an iPhone-5 is shown. In FIG. 3E an exemplary replaceable charging adapter 22 compatible with a MicroUSB power jack is shown.

Figures 4A, 4B:
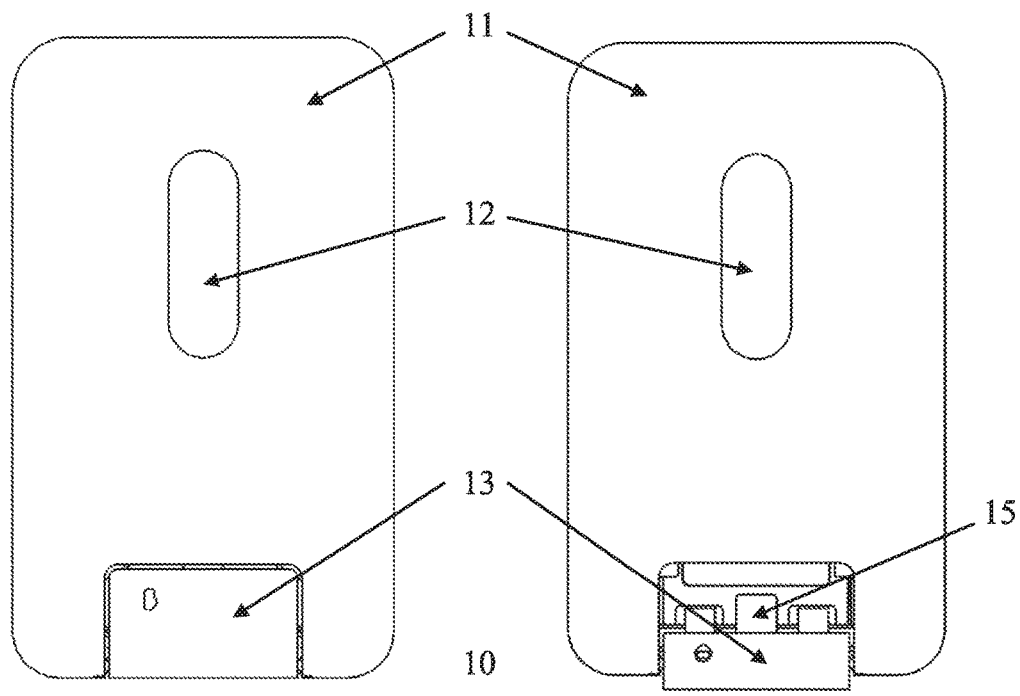
FIG. 4A is a front view of the device of FIG. 2A with stowed bottom charging and mounting support, according to some embodiments of the present invention.
FIG. 4B is a front view of the device of FIG. 2A with a bottom charging and mounting support in operable position, according to some embodiments of the present invention.

FIG. 4A, is a front view of device 10 with stowed bottom charging and mounting support 13, according to some embodiments of the present invention. FIG. 4B, is a front view of device 10 with a bottom charging and mounting support in operable position.

FIG. 5A is a rear view of device 10 with stowed exemplary American power plug 28 with exemplary European power adapter 27, according to some embodiments of the present invention. FIG. 5B is a rear view of device 10 with power plug 28 in operable position and with power adapter 27. FIG. 5C is a rear view of device 10 with power plug 28 in operable position and without power adapter 27. Optionally, as shown in FIG. 5D, prongs 29 of power plug 28 are rotated 25 degrees to fit power outlets in China and Australia.

Figure 6:
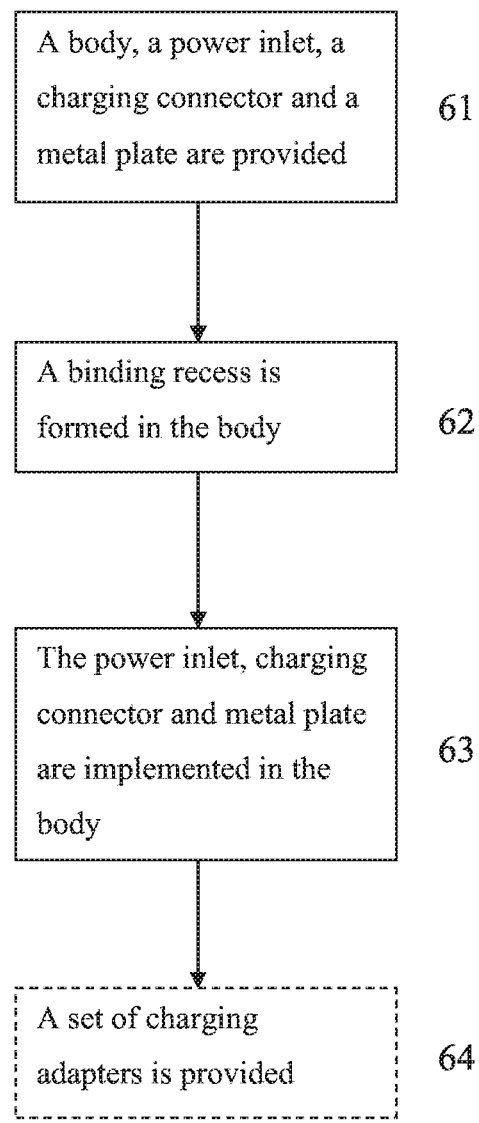
FIG. 6 is a flowchart schematically representing a method for charging a mobile phone, according to some embodiments of the present invention.

Reference is now made to FIG. 6, which is a flowchart schematically representing a method for manufacturing a device for charging a mobile phone, according to some embodiments of the present invention.

First, as shown in 61, a body is provided, having a length dimension, a width dimension and a thickness dimension, with the thickness dimension being substantially smaller than the length and width dimensions. Also, a power plug and a bottom charging and mounting support are provided.

Then, as shown in 62, a binding recess is formed in the body along the length dimension.

Then, as shown in 63, the power plug and the bottom charging and mounting support are integrated in the body, so when a mobile phone is charged, the mobile phone is mechanically supported by the bottom charging and mounting support and by the body and a lateral movement of a binding unit attached to the back of the mobile phone is confined by the binding recess.

Optionally, as shown in 64, a set of replaceable charging adapters mountable on said bottom charging and mounting support is provided.

Reference is now made to FIG. 7 which is an illustration of a device 70 for charging a mobile phone and a compatible mobile phone case 80, according to some embodiments of the present invention. Device 70 contains a body 71 which has slim-form, so the thickness of body 71 is significantly smaller the length or width of body 71. Device 70 also contains a charging and mounting support 72 integrated on the front surface of body 71. Mobile phone case 80 includes a body 81 and a back interface 82 integrated on the back surface of body 81. Optionally, the back interface is integrated directly on the back surface of a mobile phone. Charging and mounting support 72 detachably mounts back interface 82 so they are connected mechanically and electronically. When back interface 82 is mounted on charging and mounting support 72, mobile phone case 80 may move rotationally so the mobile phone is positioned at different orientations and may also be locked by rotation. Charging and mounting support 72 and back interface 82 may have any structure that allows attachment.

Figures 9, 10A, 10B:
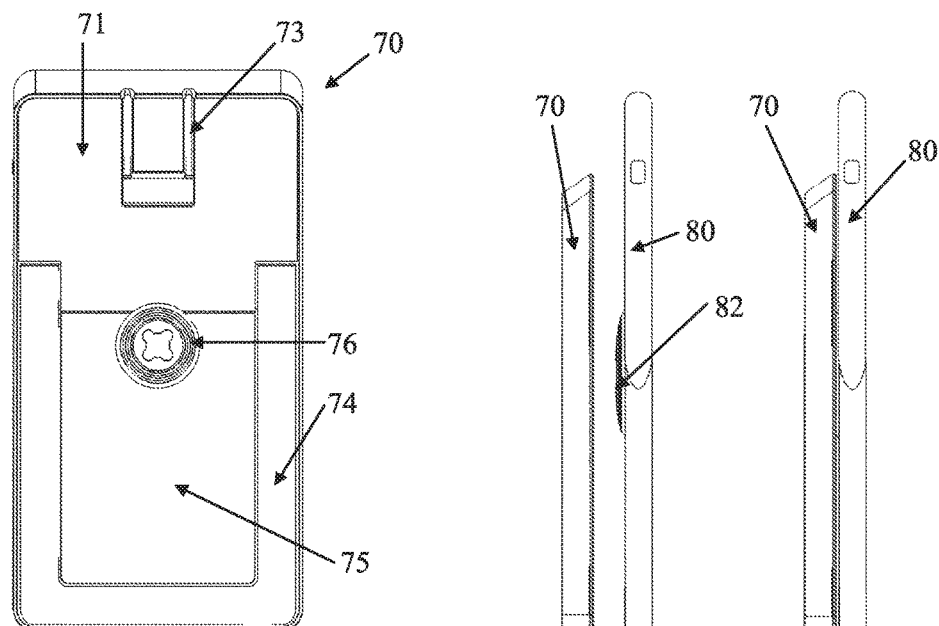
FIG. 9 is an illustration of a back view of the device of FIG. 7, according to some embodiments of the present invention.
FIG. 10A and FIG. 10B are illustrations of a side view of the device and the mobile phone case of FIG. 7 at a separated position and a mounted position respectively, according to some embodiments of the present invention.

Reference is now made to FIG. 8 and FIG. 9 which are illustrations of a front and a back view of device 70, according to some embodiments of the present invention. Reference is also made to FIG. 10A and FIG. 10B which are illustrations of a side view of device 70 and mobile phone case 80 at a separated position and a mounted position respectively. Device 70 also contains a power plug 73. Device 70 may also contain a folding arm 74. Optionally, device 70 also contains a battery 75. Battery 75 may be detachable from device 70, for example by sliding, to allow replacement of battery 75.

Optionally, device 70 also contains an attachment unit 76, integrated on the front surface of body 71, for attaching an external element. Optionally, the attachment unit has the same structure as charging and mounting support 72 or as back interface 82. Optionally, charging and mounting support 72 and attachment unit 76 are integrated in a dual side connector.

Figure 11A:
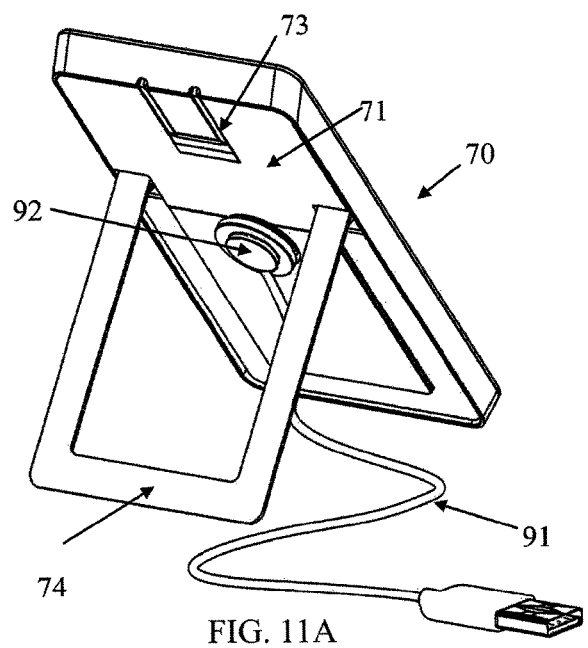
FIG. 11A is an illustration of a back view of the device of FIG. 7 having a connected universal serial bus (USB) cable and an open folding arm, according to some embodiments of the present invention.
Figure 11B:
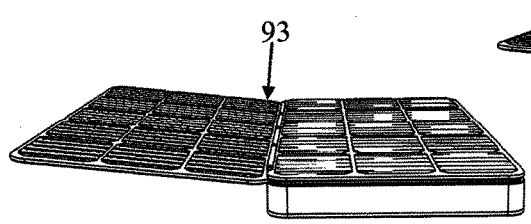
FIG. 11B and FIG. 11C are illustrations of the device of FIG. 7 having an attached and detached solar panel 93 respectively, according to some embodiments of the present invention.
Figure 11C:
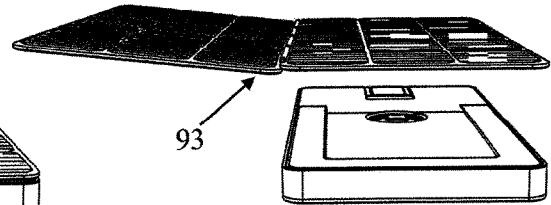
Figure 11D:
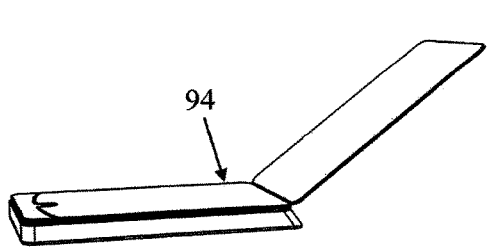
FIG. 11D and FIG. 11E illustrations of the device of FIG. 7 having a makeup kit with mirror and light-emitting diode (LED) light 94, attached and detached respectively, according to some embodiments of the present invention.
Figure 11E:
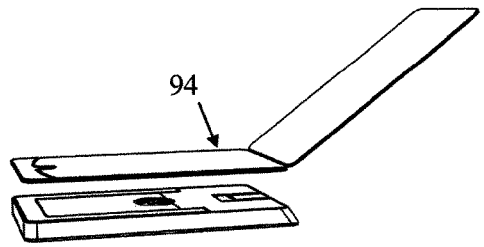

Reference is now made to FIG. 11A which is an illustration of a back view of device 70 having a connected universal serial bus (USB) cable 91 and an open folding arm 74, according to some embodiments of the present invention. USB cable 91 is connected to attachment unit 76 via connector 92, which may have similar structure as back interface 82 or as charging and mounting support 72, to fit the structure of attachment unit 76. Reference is also made to FIG. 11B and FIG. 11C which are illustrations of device 70 having an attached and detached solar panel 93 respectively, according to some embodiments of the present invention. Optionally, USB cable 91, solar panel 93 and/or any other external element are used for charging battery 75. Reference is also made to FIG. 11D and FIG. 11E which are illustrations of device 70 having an makeup kit with mirror and light-emitting diode (LED) light 94, attached and detached respectively, according to some embodiments of the present invention. Optionally, a device connected to USB cable 91, makeup kit 94 and/or any other external element connected to attachment unit 76 is powered by battery 75.

Figure 12:
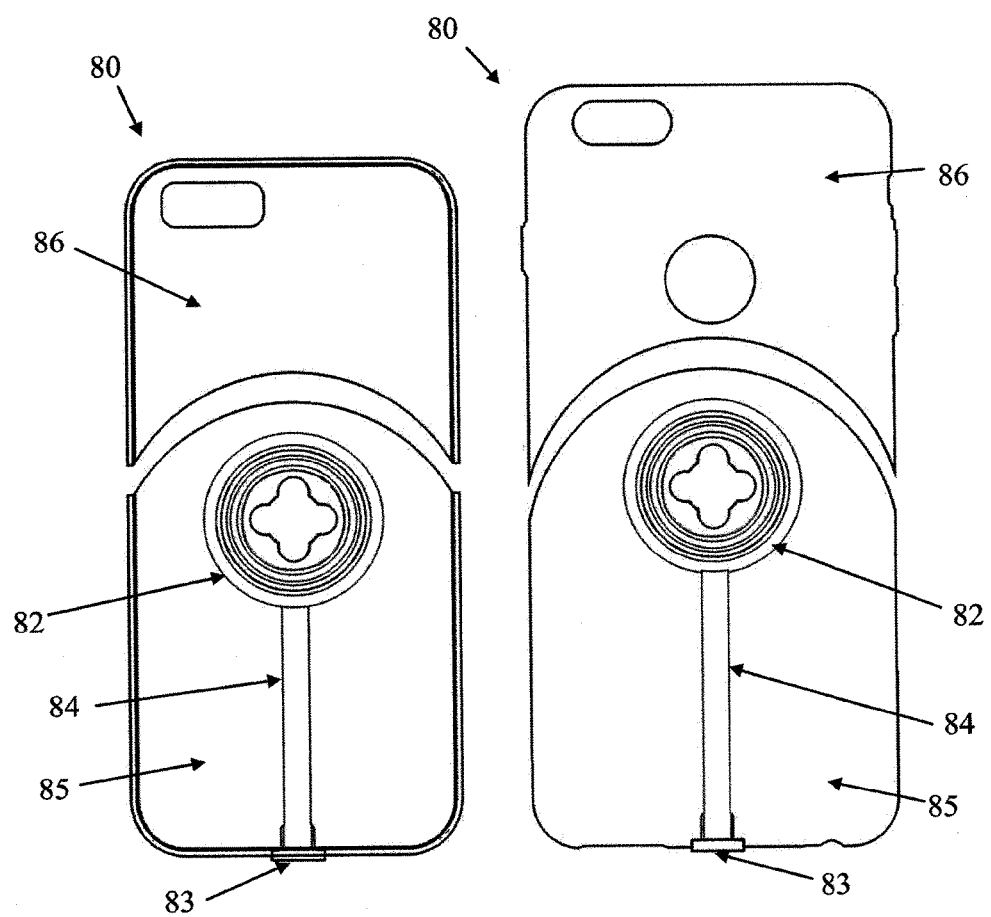
FIG. 12 is an illustration of mobile phone cases for different mobile phones, according to some embodiments of the present invention.

Reference is now made to FIG. 12 which is an illustration of mobile phone cases 80 for different mobile phones, according to some embodiments of the present invention. Optionally, back interface 82 is electronically connected to a phone plug 83 integrated on the bottom of mobile phone case 80 for connecting to a power jack located at the bottom face of the mounted mobile phone. Back interface 82 and phone plug 83 may be connected via any kind of electric connection 84, for example, wires, metal plates, and/or a thin flex printed circuit board (PCB). Optionally, body 81 includes a bottom body part 85 and a top body part 86 that cover the bottom and top of the mobile phone respectively.

Reference is now made to FIG. 13A and FIG. 13B which are illustrations of charging and mounting support 72 and back interface 82, according to some embodiments of the present invention. Reference is also made to FIG. 14 which is an illustration of a side view of charging and mounting support 72 and back interface 82, according to some embodiments of the present invention. Reference is also made to FIG. 15A, FIG. 15B, FIG. 15C and FIG. 15D which are illustrations of a front view of charging and mounting support 72, a back view of charging and mounting support 72, a front view of back interface 82 and a back view of back interface 82 respectively, according to some embodiments of the present invention.

Charging and mounting support 72 and back interface 82 include power connectors 79 and 89 respectively. When charging and mounting support 72 and back interface 82 are mechanically connected, power connector 79 is mechanically attached and electronically connected to power connector 89. Power connectors 79 and 89 may be any kind of electric connection, for example, a set of concentric coil rings, wires, PCB, and/or any other electrical connection. The concentric coil rings may include, for example, 1 ring, 2 rings, 5 rings, 10 rings and/or any other smaller, larger or intermediate number of rings. The concentric coil rings of charging and mounting support 72 are electrically coupled with the concentric coil rings of back interface 82.

Charging and mounting support 72 may include a locking plate 77 that is connected to body 71 by a centric rod 78. Locking plate 77 may be perpendicular to the longitudinal axis of centric rod 78 on its distal end. Locking plate 77 may be plus shaped, or may be of any other shape, for example, triangular, cross-shaped, star-shaped, round, oval and/or any other shape. Centric rod 78 may be of any shape, for example, a squared shape or a cylinder shape. The length of centric rod 78 may be, for example, 0.1, 0.5, 1, 2 centimeters or any other smaller, larger or intermediate length.

Optionally, charging and mounting support 72 may also include a recess. Rod 78, locking plate 77 and the concentric coil rings may be integrated inside the recess. Optionally, the recess fits a protrusion included in back interface 82. The recess may be, for example, conic, spherical and/or any other circular shape that allows rotation of the protrusion inside the recess. The diameter of the recess may be, for example, 1, 1.5, 2 centimeters or any other smaller, larger or intermediate diameter. The depth of the recess may be, for example, 0.1, 0.5, 1, 2 centimeters or any other smaller, larger or intermediate depth. The concentric coil rings may be integrated on the sidewalls of the recess. Charging and mounting support 72 thus allows fitting thereto a male connecter back interface 82 having concentric matching rings sized and shaped to be electronically connected to the concentric coil rings.

Figure 16A:
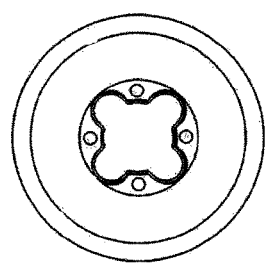
FIG. 16A and FIG. 16B are illustrations of a charging and mounting support connected to a back interface in an unlocked and a locked positioned respectively, according to some embodiments of the present invention.
Figure 16B:
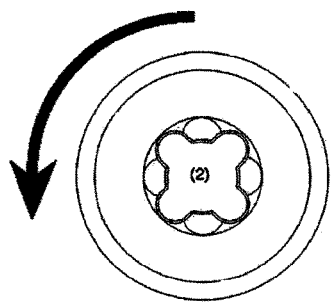
Figure 17A:
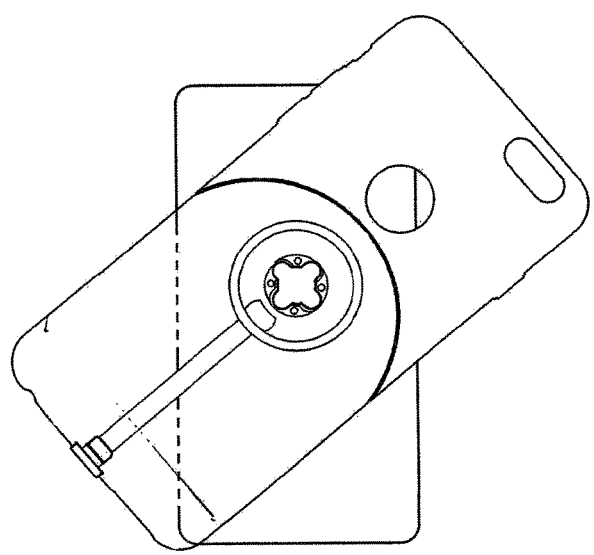
FIG. 17A, FIG. 17B and FIG. 17C are illustrations of the mobile phone case of FIG. 7 in different orientations relative to the device of FIG. 7, according to some embodiments of the present invention.
Figure 17B:
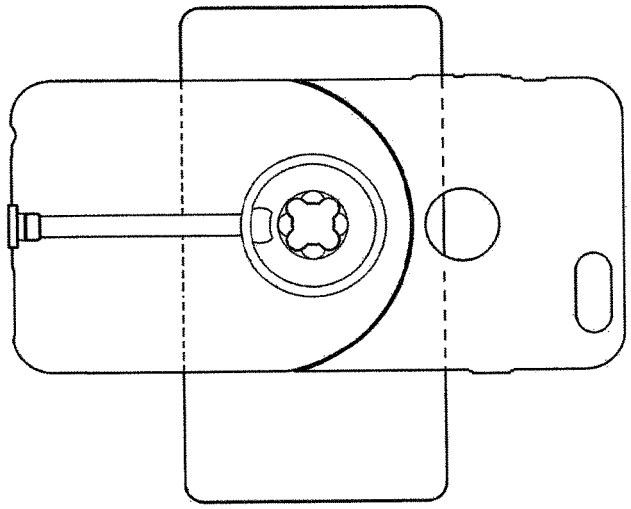
Figure 17C:
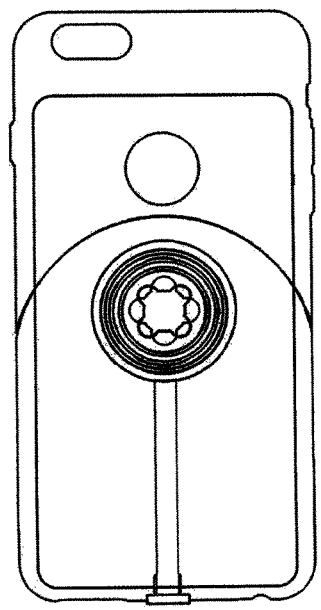
Figure 18A:
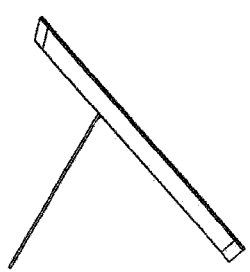
FIG. 18A, FIG. 18B, FIG. 18C and FIG. 18D are illustrations of different views of the device of FIG. 7 with an open and closed folding arm, according to some embodiments of the present invention.
Figure 18B:
Figure 18C:
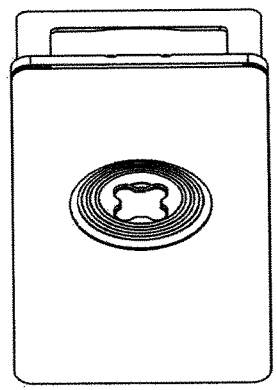
Figure 18D:
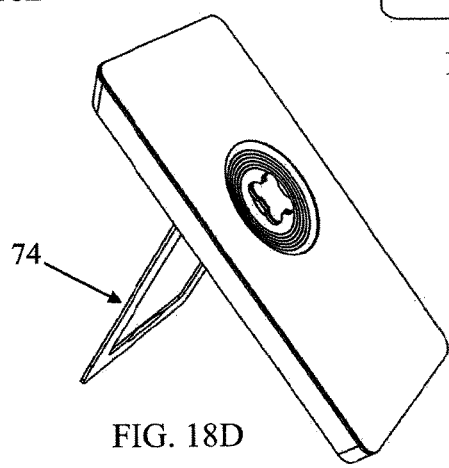

Back interface 82 includes a plate 87 that has an aperture 88. Aperture 88 is sized and shaped for receiving locking plate 77, so that locking plate 77 may be inserted into aperture 88. When mobile phone case 80 is rotated relative to device 70 after locking plate 77 is inserted into aperture 88, back interface 82 is rotated relative to charging and mounting support 72 and locking plate 77 is locked into plate 87, thus securing the attachment of both supports. Locking plate 77 and plate 87 provides mechanical coupling between charging and mounting support 72 and back interface 82, and the concentric coil rings provides electric coupling. Reference is now made to FIG. 16A and FIG. 16B which are illustrations of charging and mounting support 72 connected to back interface 82 in an unlocked and a locked positioned respectively, according to some embodiments of the present invention. Reference is also made to FIG. 17A, FIG. 17B and FIG. 17C which are illustrations of mobile phone case 80 in different orientations relative to device 70, according to some embodiments of the present invention. FIG. 17A shows a 45 degrees diagonal orientation when charging and mounting support 72 and back interface 82 are in an open position and unlocked. FIG. 17B and FIG. 17C shows portrait orientation and landscape orientation when charging and mounting support 72 and back interface 82 are in locked position.

Figure 19A:
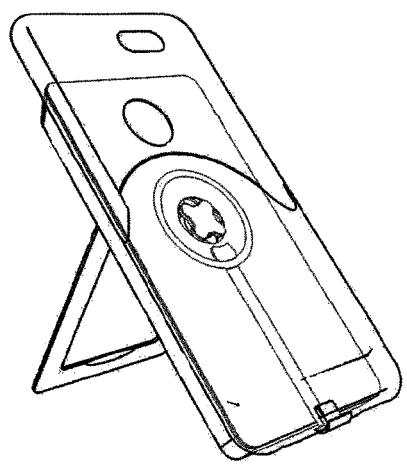
FIG. 19A and FIG. 19B are illustrations of the mobile phone case of FIG. 7 mounted on the device of FIG. 7 with an open folding arm at different orientations, according to some embodiments of the present invention.
Figure 19B:
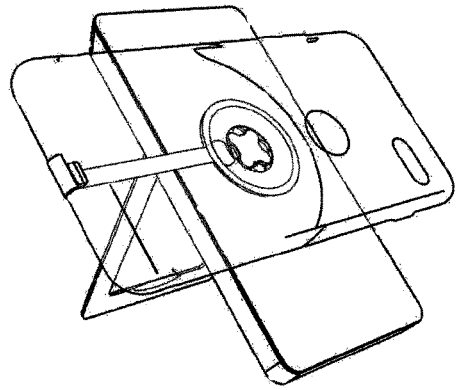

Reference is now made to FIG. 18A, FIG. 18B, FIG. 18C and FIG. 18D which are illustrations of different views of device 70 with an open and closed folding arm 74, according to some embodiments of the present invention. Reference is also made to FIG. 19A and FIG. 19B which are illustrations of mobile phone case 80 mounted on device 70 with an open folding arm 74 at different orientations, according to some embodiments of the present invention.

Reference is now made to FIG. 20A, FIG. 20B, FIG. 20C, FIG. 20D and FIG. 20E which are illustrations of device 70 with different positions of power plug 73, according to some embodiments of the present invention. FIG. 20A shows device 70 with power plug 73 in an operable position mounting mobile phone case 80. When connected to a power outlet, a mobile phone encased in mobile phone case 80 is charged. FIG. 20B shows device 70 with power plug 73 in an operable position without mobile phone case 80, so when connected to a power outlet, an optional battery of device 70 is charged. FIG. 20C shows device 70 with exemplary American power plug 73. FIG. 20D shows device 70 with prongs of power plug 73 rotated to fit power outlets in China and Australia. FIG. 20E, FIG. 20F, FIG. 20G, and FIG. 20H show power plug 73 in operable position and with power adapter at different positions.

Reference is now made to FIG. 21, which is a flowchart schematically representing a method for manufacturing a device for charging a mobile phone, according to some embodiments of the present invention.

First, as shown in 211, a body is provided, having a length dimension, a width dimension and a thickness dimension, with the thickness dimension being substantially smaller than the length and width dimensions. Also, a power plug and a charging and mounting support are provided.

Then, as shown in 212, the power plug is integrated in the body.

Finally, as shown in 213, the charging and mounting support is integrated on the front surface of the body, so the charging and mounting support is detachably, mechanically and electronically mounting a back interface integrated on the back surface of a mobile phone case.

In an exemplary scenario of using a device for charging a mobile phone according to some embodiments of the present invention, a user stores the device in his pocket. When arriving to an office with a power outlet, the user pulls the device from his pocket and changes the position of the power plug of the device from stowed position to operable position, and plugs the power plug of the device to the power outlet. Then the user changes the position of the bottom charging and mounting support of the device from stowed position to operable position and connects his mobile phone to the device by a power jack located at the bottom face of the mobile phone. The mobile phone is held by a magnetic sticker on his phone to a metal plate which is the binding recess of the device. Then, when the battery of the mobile phone is fully charged, the user removes the mobile phone from the device, and the battery of the device is being charged from the power outlet through the power plug. Afterwards, when arriving to an office with no power outlet, the user changes the position of the folding arm of the device from stowed position to operable position, places the device on the desk and connects his mobile phone to the device. The mobile phone is then charging from the battery of the device through the bottom charging and mounting support. Then, while charging, the user inserts a memory card to the memory card slot of the device. Data from the mobile phone is then automatically transferred to the memory card through the bottom charging and mounting support of the device. Then, when the battery of the mobile phone is fully charged, the user disconnects the mobile phone from the bottom charging and mounting support and attaches the mobile phone, in landscape orientation, to the binding recess by the magnetic sticker, and watches a video. Afterwards, the user wants to charge a second mobile phone with the device. The user removes the replaceable charging adapter connected to the bottom charging and mounting support and connects a different replaceable charging adapter, compatible with the power jack the second mobile phone.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant chargers for a mobile phone will be developed and the scope of the term charger is intended to include all such new technologies a priori.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A kit for charging a mobile device with a magnetic sticker, the kit comprising:
    a charging device, comprising:
        a body having a length dimension along a body vertical axis, a width dimension along a body horizontal axis that is perpendicular to the body vertical axis, and a thickness dimension along a body rotational axis that is perpendicular to the body vertical axis and to the body horizontal axis, with the thickness dimension being substantially smaller than the length dimension and the width dimension;
        a power plug integrated in the body; and
        a mounting support integrated into a front surface of the body; and
    a magnetic sticker having a mobile device vertical axis, wherein the magnetic sticker is configured to be coupled to a back surface of a mobile device, and wherein the magnetic sticker comprises a back interface integrated on a back surface of the magnetic sticker, the back interface of the magnetic sticker being configured to detachably and magnetically mount a mobile device coupled to the magnetic sticker to the charging and mounting support;
    wherein the front surface of the body includes a recess, wherein the back interface of the magnetic sticker includes at least one protrusion, and wherein the at least one protrusion is configured to be received by the recess, whereby, when the at least one protrusion is received by the recess, (1) the recess and the at least one protrusion cooperate to position the mobile device with respect to the body, (2) the charging device and the magnetic sticker cooperate to prevent the mobile device from moving away from the body along the body rotational axis when the mobile device vertical axis is either (a) parallel to the body vertical axis or (b) perpendicular to the body vertical axis, and (3) the charging device and the magnetic sticker cooperate to allow the mobile device to move with respect to the body along the body rotational axis when the mobile device vertical axis is oriented diagonally with respect to the body vertical axis.

2. The kit of claim 1, wherein the charging device comprises a battery.

3. The kit of claim 2, wherein the battery is integrated in the body.

4. The kit of claim 2, wherein the battery is charged through the power plug.

5. The kit of claim 2, wherein the charging device is configured to charge the mobile device from the battery.

6. The kit of claim 2, wherein the battery provides power for electronic elements of the charging device.

7. The kit of claim 2, wherein the battery provides power for an external element connected to the charging device.

8. The kit of claim 2, wherein the battery is charged through an external element connected to the charging device.

9. The kit of claim 2, wherein the battery is detachable from the charging device.

10. The kit of claim 1, wherein the charging device comprises a kickstand.

11. A method of positioning a mobile device with respect to a charging device, the method comprising:
   providing a charging device, the charging device comprising:
      a body having a length dimension along a body vertical axis, a width dimension along a body horizontal axis that is perpendicular to the body vertical axis, and a thickness dimension along a body rotational axis that is perpendicular to the body vertical axis and to the body horizontal axis, with the thickness dimension being substantially smaller than the length dimension and the width dimension;
      a power plug integrated in the body; and
      a recess formed in the front surface of the body;
   providing a mobile device having a back surface and a mobile device vertical axis;
   providing a magnetic sticker configured to be coupled to a back surface of a mobile device, the magnetic sticker having a back surface, at least one protrusion extending from the back surface of the magnetic sticker;
   coupling the magnetic sticker to the back surface of the mobile device; and
   positioning the mobile device adjacent to the charging device such that the recess of the body receives the at least one protrusion of the magnetic sticker,
   whereby, when the recess receives the at least one protrusion:
      (1) the recess and the at least one protrusion cooperate to position the mobile device with respect to the body,
      (2) the charging device and the magnetic sticker cooperate to prevent the mobile device from moving away from the body along the body rotational axis when the mobile device vertical axis is either (a) parallel to the body vertical axis or (b) perpendicular to the body vertical axis, and
      (3) the charging device and the magnetic sticker cooperate to allow the mobile device to move with respect to the body along the body rotational axis when the mobile device vertical axis is oriented diagonally with respect to the body vertical axis.

* * * * *